(12) United States Patent
Shafiee et al.

(10) Patent No.: US 10,122,568 B2
(45) Date of Patent: Nov. 6, 2018

(54) DIGITAL COMPENSATION OF IQ COUPLING IN COMMUNICATION RECEIVERS

(71) Applicant: Microchip Technology Incorporated, Chandler, AZ (US)

(72) Inventors: Hamid Shafiee, Irvine, CA (US); Mohsen Pourkhaatoun, Laguna Niguel, CA (US); Kiran Gowda, Irvine, CA (US); Siddharth Shetty, Irvine, CA (US); Esmael Heidari, Mission Viejo, CA (US); Ali Fard, Irvine, CA (US); Rahim Bagheri, Poway, CA (US); Masoud Djafari, Laguna Hills, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/642,347

(22) Filed: Jul. 6, 2017

(65) Prior Publication Data
US 2018/0013605 A1 Jan. 11, 2018

Related U.S. Application Data

(60) Provisional application No. 62/359,372, filed on Jul. 7, 2016.

(51) Int. Cl.
*H04L 5/12* (2006.01)
*H04L 23/02* (2006.01)
*H04L 27/38* (2006.01)
*H04L 27/22* (2006.01)
(Continued)

(52) U.S. Cl.
CPC ........ *H04L 27/3863* (2013.01); *H04L 1/0045* (2013.01); *H04L 27/22* (2013.01); *H04L 2027/003* (2013.01); *H04L 2027/0038* (2013.01)

(58) Field of Classification Search
CPC ... H04L 27/3863; H04L 27/22; H04L 1/0045; H04L 2027/003; H04L 2027/0038
See application file for complete search history.

(56) References Cited

U.S. PATENT DOCUMENTS

2004/0193965 A1* 9/2004 Coersmeier ....... H04L 25/03019 714/48
2005/0220003 A1 10/2005 Palaskas et al. ............. 370/210
(Continued)

FOREIGN PATENT DOCUMENTS

WO 03/012979 A1 2/2003 ............... H03C 3/40

OTHER PUBLICATIONS

International Search Report and Written Opinion, Application No. PCT/US2017/041140, 11 pages, dated Oct. 16, 2017.

*Primary Examiner* — Sam K Ahn
*Assistant Examiner* — Amneet Singh
(74) *Attorney, Agent, or Firm* — Slayden Grubert Beard PLLC (57) ABSTRACT

A receiver circuit includes a conversion circuit configured to down-convert a received radio-frequency signal to a baseband signal, an analog-to-digital converter configured to sample the baseband signal into a sampled signal, a Fast Fourier transform (FFT) circuit configured to perform an FFT on the sampled signal, and a digital compensation circuit configured to compensate for IQ distortion in a frequency domain.

12 Claims, 5 Drawing Sheets

(51) Int. Cl.
*H04L 1/00* (2006.01)
*H04L 27/00* (2006.01)

(56) References Cited

U.S. PATENT DOCUMENTS

| | | | |
|---|---|---|---|
| 2010/0111230 A1* | 5/2010 | Lee .................... | H04L 27/3863 375/322 |
| 2011/0013724 A1* | 1/2011 | Metreaud ............ | H04L 27/0014 375/296 |
| 2011/0222638 A1* | 9/2011 | Park ................... | H04L 27/3863 375/346 |
| 2012/0106686 A1 | 5/2012 | Zhang et al. ................. | 375/349 |
| 2012/0288026 A1* | 11/2012 | Wang .................. | H04B 1/0475 375/285 |
| 2014/0355722 A1* | 12/2014 | Hsu ...................... | H04L 27/364 375/340 |

* cited by examiner

$\lambda_1(\omega) = [1 + \frac{\omega}{2}(\beta_1 - \beta_2)], \quad \lambda_2(\omega) = [-\frac{\omega}{2}(\beta_1 - \beta_2)]$ $\delta = \lambda_1(\omega)\lambda_1(-\omega) - \lambda_2(\omega)\lambda_2(-\omega)$

DIGITAL COMPENSATION OF IQ COUPLING IN COMMUNICATION RECEIVERS

RELATED PATENT APPLICATION

This application claims priority to commonly owned U.S. Provisional Patent Application No. 62/359,372; filed Jul. 7, 2016, which is hereby incorporated by reference herein for all purposes.

TECHNICAL FIELD

The present disclosure relates to wireless data communication systems and, in particular, digital compensation of IQ coupling in communication receivers.

BACKGROUND

In wireless communication receivers, the radio-frequency (RF) signal is amplified by one or more low noise amplifiers (LNA's) and down-converted to baseband. The resulting in-phase (I) and quadrature (Q) waveforms are further amplified and filtered before they are sampled with a pair of analog-to-digital converters (ADC's). The sampled waveforms are then processed so that the transmitted bit sequence is recovered. Distortion in the circuitry such as local-oscillator phase noise or gain/phase imbalances in the I and Q paths will affect the performance of the receiver.

SUMMARY

Embodiments of the present disclosure include a receiver circuit. The receiver circuit may include a conversion circuit, an analog-to-digital converter, an FFT circuit, and a digital compensation circuit. The conversion circuit may be configured to down-convert a received radio-frequency signal to a baseband signal. In combination with any of the above embodiments, the analog-to-digital converter may be configured to sample the baseband signal into a sampled signal. In combination with any of the above embodiments, the FFT circuit may be configured to perform an FFT on the sampled signal. In combination with any of the above embodiments, the digital compensation circuit may be configured to compensate for IQ distortion in a frequency domain. In combination with any of the above embodiments, the digital compensation circuit is configured to, in a first branch, multiply a complex baseband signal by a first correction for carrier frequency offset to generate a first multiplied signal, perform a first FFT on the first multiplied signal through the FFT circuit, and multiply an output from the first FFT with a first factor to form first output data. In combination with any of the above embodiments, the digital compensation circuit may be configured to, in a second branch, multiply a complex baseband signal by a second correction for carrier frequency offset to generate a second multiplied signal, perform a second FFT on the second multiplied signal through the FFT circuit, perform cyclic inversion/conjugation, and multiply output of the second FFT with a second factor to form second output data. In combination with any of the above embodiments, the digital compensation circuit may be configured to add the first output data and the second output data. In combination with any of the above embodiments, the digital compensation circuit may be configured to, in the second branch, perform conjugation by inverting and conjugating an output of the second FFT and multiply inverted and conjugated output of the second FFT with the second factor to form the second output data. In combination with any of the above embodiments, the digital compensation circuit may be configured to, in the second branch, perform conjugation by conjugating the complex baseband signal, and multiply the conjugated complex baseband signal by the second correction for carrier frequency offset to generate the second multiplied signal. In combination with any of the above embodiments, the first correction and the second correction may be dependent upon frequency. In combination with any of the above embodiments, the receiver may include an equalizer circuit configured to equalize a sum of the first output data and the second output data. In combination with any of the above embodiments, the first correction may be $e^{+/-j\Delta\omega nT_s}$, wherein $\Delta\omega$ corresponds to a frequency offset and Ts is a sampling period. In combination with any of the above embodiments, the first factor may be $\lambda_1(\omega)/\delta$ and the second factor is $\lambda_2(\omega)/\delta$, wherein $$\lambda_1(\omega) = \left[1 + \frac{\omega + \Delta\omega}{2}(\beta_1 - \beta_2)\right], \lambda_2(\omega) = \left[-\frac{\omega + \Delta\omega}{2}(\beta_1 + \beta_2)\right]$$

$$\delta = \lambda_1(\omega)\lambda_1(-\omega - 2\Delta\omega) - \lambda_2(\omega)\lambda_2(-\omega - 2\Delta\omega).$$

In combination with any of the above embodiments, $\Delta\omega$ corresponds to a frequency offset, $\omega$ corresponds to a frequency, Ts is a sampling period, and $\beta_1$ and $\beta_2$ are coupling coefficients. In combination with any of the above embodiments, the digital compensation circuit may be configured to compensate for IQ distortion arising from IQ coupling after down-conversion. In combination with any of the above embodiments, the radio-frequency signal may include orthogonal-frequency-domain multiplexing (OFDM) packets.

Embodiments of the present disclosure also include systems including receivers implemented according to any of the embodiments discussed above. Embodiments of the present disclosure further include methods performed by any of the systems or receivers discussed above.

DETAILED DESCRIPTION

Figure 1:
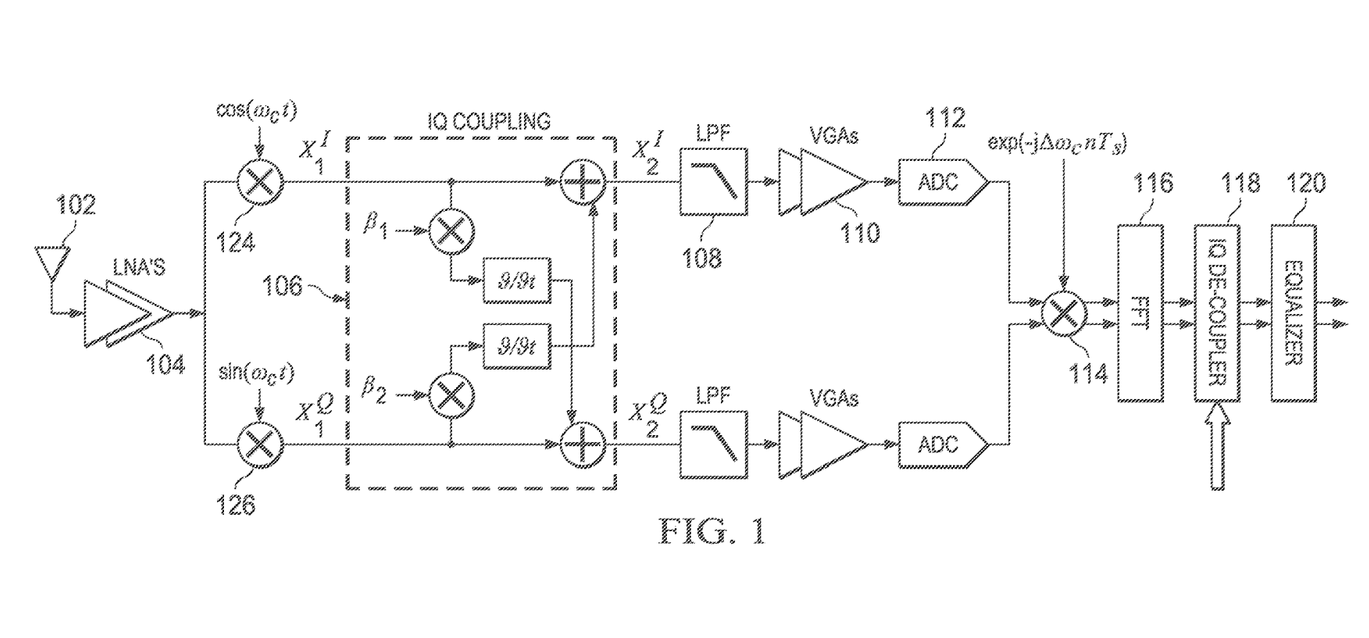
FIG. 1 is an illustration of an example system for digital compensation of IQ coupling, according to embodiments of the present disclosure.
Figure 2A:
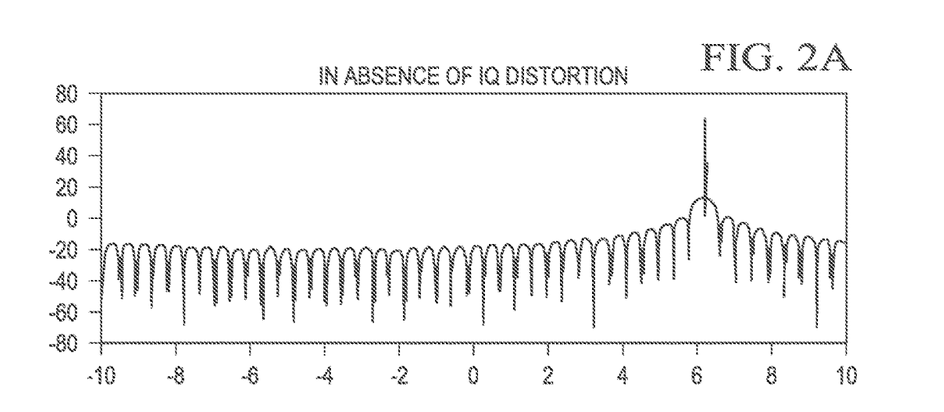
FIGS. 2A-2C, 3, and 4 illustrate example cross-talk effects and corrections thereof, according to embodiments of the present disclosure.
Figure 2B:
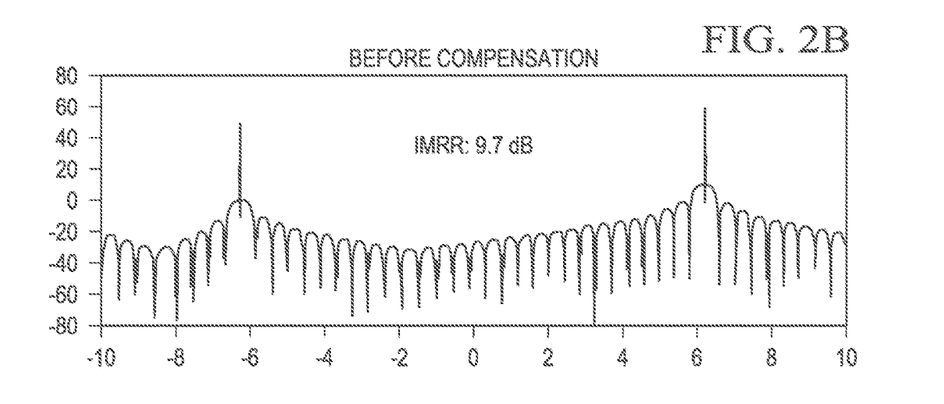
Figure 2C:
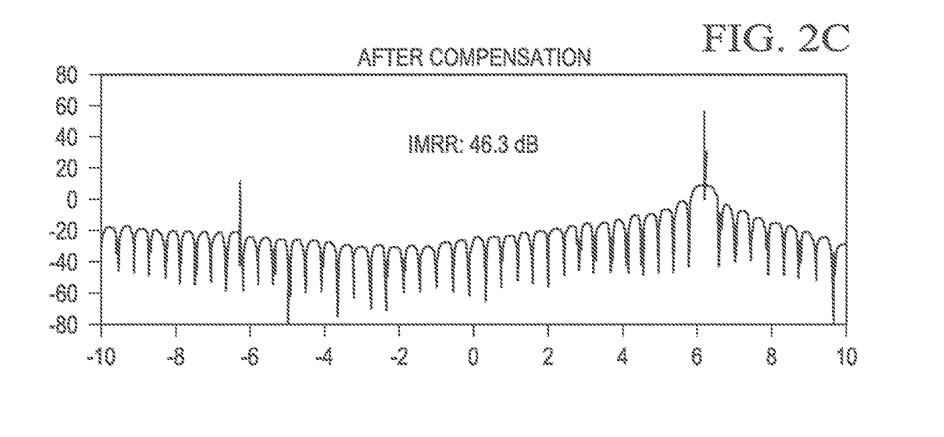

FIG. 1 is an illustration of an example system 100 for digital compensation of IQ coupling, according to embodiments of the present disclosure. The digital compensation may be performed in communication receivers. The communication receivers may include wireless communication receivers, such as WIFI receivers.

A radio-frequency (RF) signal may be received by an antenna 102. The received signal may be amplified using one or more low-noise amplifiers (LNA) 104 and down-converted to a baseband signal. The waveform may then be filtered with a low-pass filter (LPF) 108 and amplified again using one or more variable gain amplifiers (VGA) 110. The resultant signal may be sampled with one or more analog analog-to-digital converters (ADC) 112. The signal may be adjusted with a multiplier circuit 114, which may correct for the effect of the carrier frequency offset. A Fast Fourier Transform (FFT) circuit 116 may apply an FFT to the signal and route the results to an IQ-decoupler circuit 118. The output of the IQ-decoupler circuit 118 may be routed to an equalizer circuit 118, which may perform equalization in the frequency-domain. The equalizer circuit may adjust the signal by applying coefficients. The transmitted sequence is recovered after the digital signal is passed out of equalizer circuit 120 to one or more decoders.

IQ coupling 106 may occur in system 100. In one embodiment, IQ-decoupler circuit 118 may digitally compensate for effects of IQ coupling 106. IQ coupling 106 may occur when the signal is down-converted to a baseband signal. The signal, before down-conversion, may be at a carrier frequency dependent upon the wireless communications protocol. For example, the signal may include WIFI packets transported on a 2.4 GHz signal. Down-conversion may be performed by the sin and cos functions of respective multipliers. The resulting in-phase (I) and quadrature (Q) waveforms may be amplified and filtered before they are sampled with ADCs 112. IQ coupling 106 may cause a form of distortion that includes a spurious cross-talk between I and Q signals caused by parasitic effects. IQ coupling 106 may add a distortion proportional to the derivative of the in-phase component to the to the quadrature waveform, and vice versa. If such an effect is left uncompensated, the packet-error-rate (PER) performance of the receiver formed by system 100 may be severely degraded.

The down-converted I and Q signal may be specified by $x_1^I$ and $x_1^Q$, respectively. Cross-talk between the two may occur in IQ coupling 106. After IQ coupling 106, the in-phase waveform may be specified as $x_2^I$ and the quadrature waveform may be given by $x_2^Q$. Each of the I and Q components after IQ coupling 106 may include the previous I or Q component plus a distortion. The distortion may include a derivative of the other of the I or Q components times a respective factor. Thus, the I and Q components after IQ coupling may be given as:

$$x_2^I = x_1^I + \beta_1 \frac{\delta x_1^Q}{\delta t}$$

$$x_2^Q = x_1^Q + \beta_2 \frac{\delta x_1^I}{\delta t}$$

Accordingly, a signal proportional to the derivative of the in-phase component is added to the quadrature waveform, and vice versa.

Figure 3:
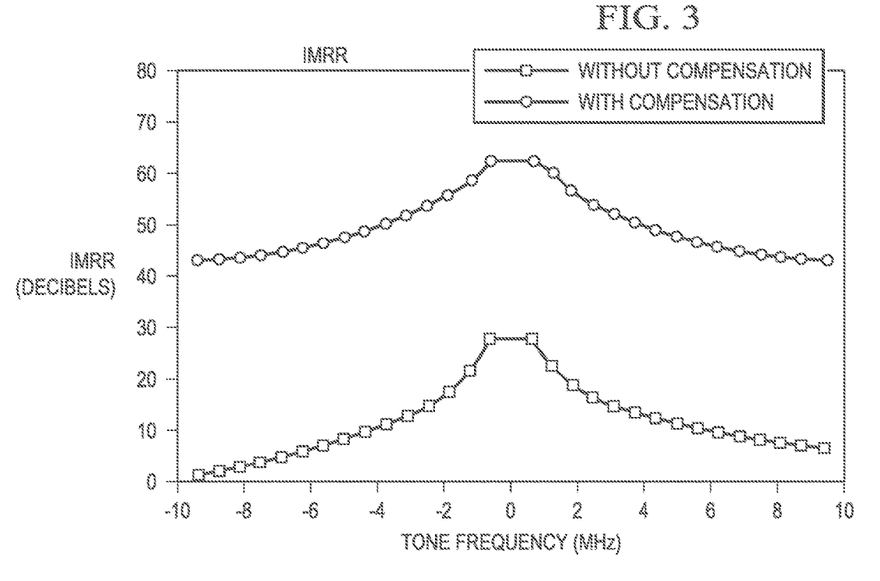
Figure 4:
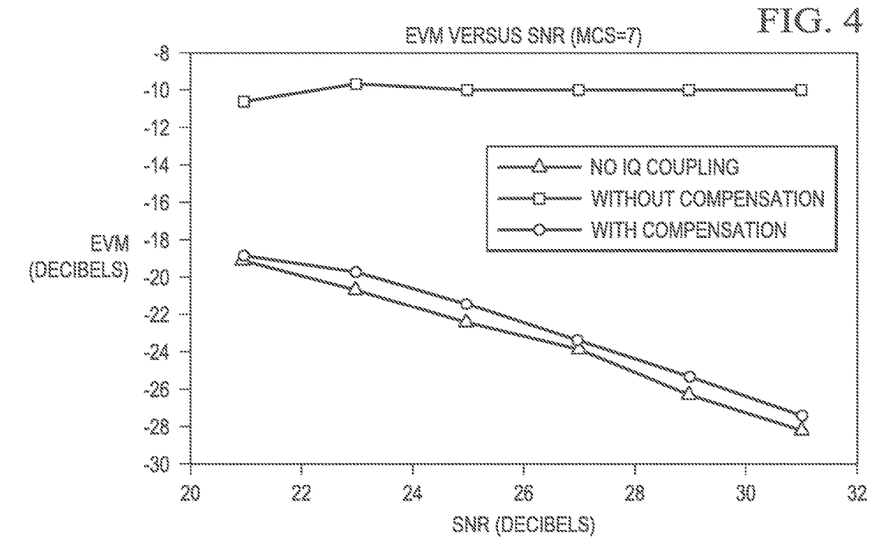

FIGS. 2A-2C, 3, and 4 illustrate example cross-talk effects and corrections thereof, according to embodiments of the present disclosure. In (a) in FIGS. 2A-2C, an RF tone is shown as received by system 100 if no IQ distortion, or other effect related to IQ coupling 106 occurs. The signal spectrum at the baseband is shown when no distortion is present. In (b), the RF tone with cross-talk caused by IQ coupling 106 is shown. The baseband spectrum is shown when the effect of IQ coupling 106 is present. In this case, the multiplicative coefficients (β1 and β2) are set to 0.3, and 0.1. In addition to the expected tone, a spurious component is present at the image frequency such that the image rejection ratio (IMRR) is only 9.7 dB. The IMRR due to the IQ coupling distortion may be frequency dependent. In (c), the RF tone after digital compensation performed by system 100 is shown. The signal spectrum at the baseband resulting from digital compensation of an RF tone is shown. IMRR may be increased to 46 dB. In FIG. 3, the IMRR of system 100 when experiencing IQ coupling distortion (with and without digital compensation) is plotted against frequency. Thus, the IMRR may get worse as the frequency increases, particularly when no compensation is used. In FIG. 4, receiver performance of system 100 is shown. The error-vector-magnitude (EVM) vs. signal-to-noise ratio (SNR) curves plotted for orthogonal-frequency-domain multiplexing (OFDM) packets used as the transmitted data. Performance wherein system 100 digitally compensates for IQ-coupling distortion approaches performance wherein IQ-coupling distortion never occurred, and improves upon situations wherein IQ-coupling occurs without digital compensation.

Returning to FIG. 1, in one embodiment, compensation of IQ-coupling 106 may be performed by IQ-decoupler circuit 118 in in the digital domain. Thus, system 100 may correct the IQ-coupling effect in a modem. Moreover, the distortion may be removed in the frequency domain. In particular, system may perform digital compensation in the frequency domain for data of OFDM communication systems. In such OFDM communication systems, the signal is already intended to be transformed to the Fourier domain for data demodulation. By applying suitable signal processing operations on the frequency-domain samples such as digital compensation, the effect of the IQ-coupling distortion may be removed.

Design of digital compensation may first include deriving a form of a compensation solution when no carrier frequency offset (CFO) is present. CFO may refer to the frequency offset between the frequencies of the local oscillators (LO) in the transmitter and receiver.

Figure 5:
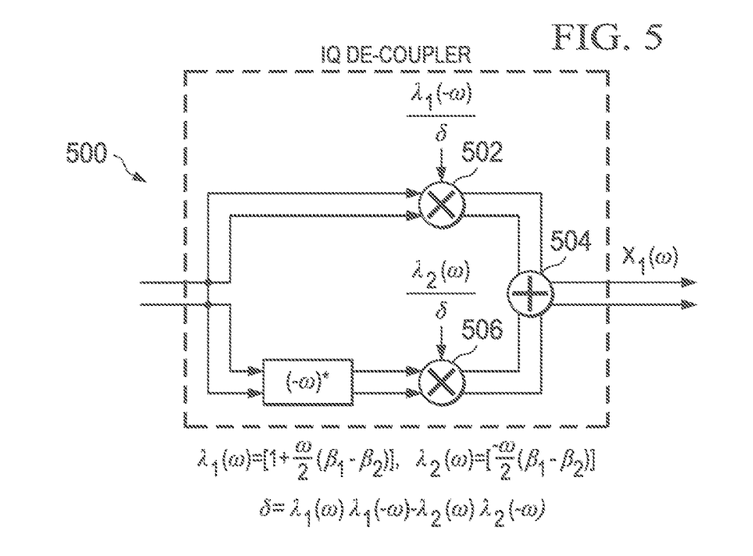
FIG. 5 illustrates an example of a digital compensation circuit, according to embodiments of the present disclosure.

Digital compensation may be applied to frequency domain samples. FIG. 5 illustrates an example of a digital compensation circuit 500, according to embodiments of the present disclosure. Digital compensation circuit 500 may implement IQ decoupler circuit 118.

Digital compensation circuit may include multiplier circuits 502, 506 and a summer circuit 504. Multiplier circuit 502 may apply a factor of $$\frac{\lambda_1(-\omega)}{\delta}$$

to a real portion of its input signal.

Moreover, multiplier circuit 506 may apply a factor of $$\frac{\lambda_2(\omega)}{\delta}$$

to an imaginary portion of its input signal.

The outputs of multiplier circuits 502, 506 may be summed by summer circuit 504 to yield the $X_1(\omega)$ signal. The constituent components may be given as:

$$\lambda_1(\omega) = 1 + \frac{\omega}{2}(\beta_1 - \beta_2)$$

$$\lambda_2(\omega) = \frac{-\omega}{2}(\beta_1 + \beta_2)$$

$$\delta = \lambda_1(\omega)\lambda_1(-\omega) - \lambda_2(\omega)\lambda_2(-\omega)$$

The block $(-\omega^*)$ may indicate cyclic inversion and conjugation of the FFT output.

The output, $X_1$, may be derived beginning with the proposition that the complex signal I+jQ may be the complex signal as-affected by the IQ-coupling distortion, specified as:

$$\begin{cases} I_2(t) = I_1(t) + \beta_1 \frac{\partial Q_1(t)}{\partial t} \\ Q_2(t) = Q_1(t) + \beta_2 \frac{\partial I_1(t)}{\partial t} \end{cases}$$

$$I_2(t) + jQ_2(t) = I_1(t) + jQ_1(t) + \beta_1 \frac{\partial Q_1(t)}{\partial t} + j\beta_2 \frac{\partial I_1(t)}{\partial t}$$

Given then definition of $x_k(t)=I_k(t)+jQ_k(t)$, k=1, 2, this may result in $$x_2(t) = x_1(t) + \beta_1 \frac{\partial}{\partial t}\left(\frac{x_1(t) - x_1^*(t)}{2j}\right) + j\beta_2 \frac{\partial}{\partial t}\left(\frac{x_1(t) + x_1^*(t)}{2}\right)$$

Applying a Fourier transform may yield:

$$X_2(\omega) = X_1(\omega) + \frac{\beta_1 \omega}{2}(X_1(\omega) - X_1^*(-\omega)) - \frac{\beta_2 \omega}{2}(X_1(\omega) + X_1^*(-\omega))$$

$$= \left(1 + \frac{\beta_1 - \beta_2}{2}\omega\right)X_1(\omega) - \left(\frac{\beta_1 + \beta_2}{2}\omega\right)X_1^*(-\omega)$$

Given the definitions of $\lambda_1$ and $\lambda_2$ from above, then $$\begin{cases} X_2(\omega) = \lambda_1(\omega)X_1(\omega) + \lambda_2(\omega)X_1^*(-\omega) \\ X_2^*(-\omega) = \lambda_1^*(-\omega)X_1^*(-\omega) + \lambda_2^*(-\omega)X_1(\omega) \end{cases}$$

Accordingly, $$X_1(\omega) = \frac{\lambda_1^*(-\omega)X_2(\omega) - \lambda_2(\omega)X_2^*(-\omega)}{\lambda_1(\omega)\lambda_1^*(-\omega) - \lambda_2(\omega)\lambda_2^*(-\omega)}$$

or $$X_1(\omega) = \frac{\lambda_1^*(-\omega)X_2(\omega) - \lambda_2(\omega)X_2^*(-\omega)}{\delta(\omega)}$$

wherein $$\delta(\omega) = \lambda_1(\omega)\lambda_1^*(-\omega) - \lambda_2(\omega)\lambda_2^*(-\omega)$$

Furthermore, FIG. 5 demonstrates the implementation of the $X_1(\omega)$ expression shown above.

Figure 6A:
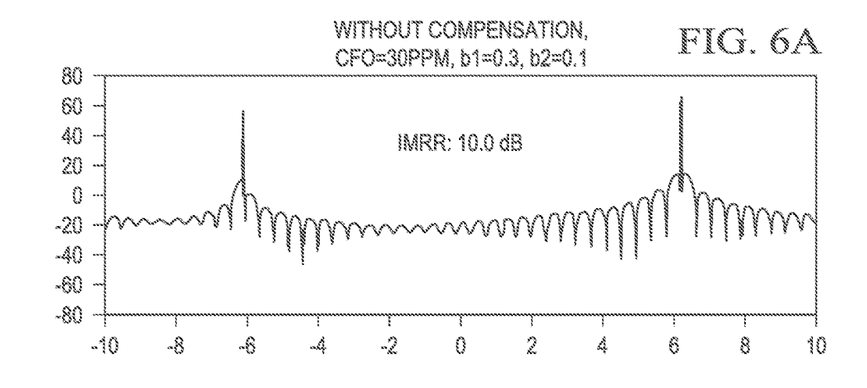
FIGS. 6A-6B illustrate reception of an RF tone when channel offset frequency is non-zero and the IQ coupling distortion is present, according to embodiment of the present disclosure.
Figure 6B:
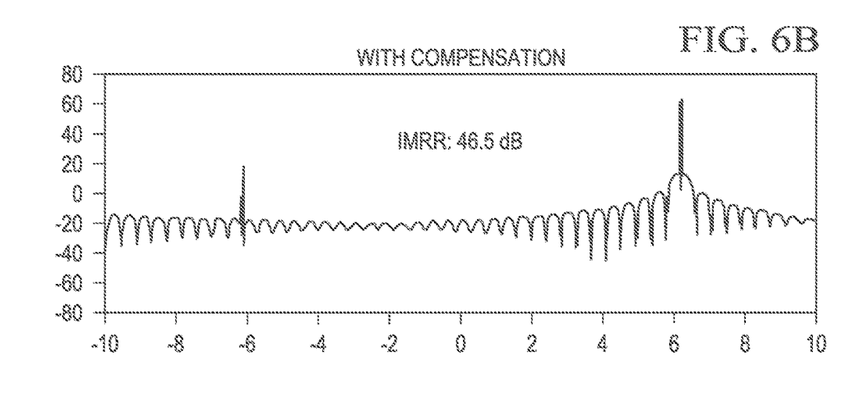

However, if an RF tone is received when CFO is non-zero and the IQ coupling distortion is present, the spurious component might not be at the image frequency. FIGS. 6A-6B illustrates such a case, according to embodiment of the present disclosure. In (a), where IQ coupling distortion occurs, the CFO is 30 parts-per-million (ppm), $\beta_1$ is 0.3, and $\beta_2$ is 0.1, the IMRR may be observed to be only about 10 dB. Accordingly, the digital compensation may be modified to account for the combined effects of CFO and IQ coupling.

Figure 7:
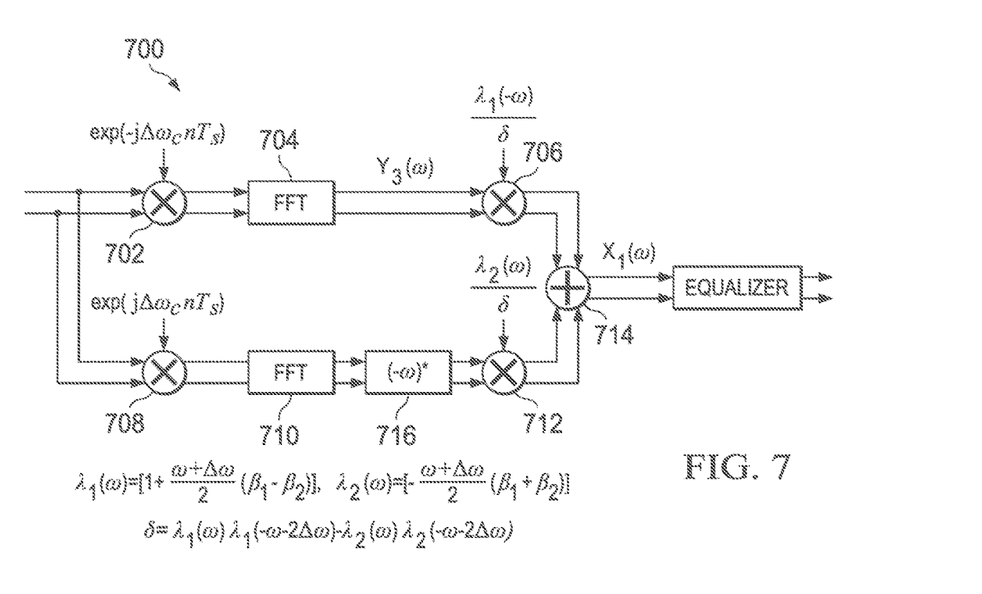
FIG. 7 illustrates an example of a digital compensation circuit for compensating carrier offset frequency and IQ coupling, according to embodiments of the present disclosure.

FIG. 7 illustrates an example of a digital compensation circuit 700 for compensating carrier offset frequency and IQ coupling, according to embodiments of the present disclosure. Digital compensation circuit 700 may implement IQ decoupler circuit 118. Moreover, digital compensation circuit 700 may implement FFT circuit 116. Also, digital compensation circuit 700 may implement multiplier circuit 114. Digital compensation circuit 700 may output to equalizer circuit 120.

Digital compensation circuit 700 may include multiplier circuits 702, 706, 708, 712, FFT circuits 704, 710, and a summer circuit 714. Multiplier circuits 702, 708 may be configured to correct for the effect of the carrier frequency offset. Multiplier circuit 702 may be configured to multiply the complex time-domain result of analog-to-digital conversion by $e^{-j\Delta\omega_c nT_s}$. The sample index may be denoted by n. The $\Delta\omega$ may specify the frequency offset. $T_s$ may be the sampling period. The result may be passed to FFT circuit 704. Multiplier circuit 708 may be configured to multiply the complex time-domain result of analog-to-digital conversion by $e^{j\Delta\omega_c nT_s}$. The result may be passed to FFT circuit 710.

FFT circuit 704 may perform a fast Fourier transform on its input and pass the output to multiplier circuit 706. FFT circuit 710 may perform a fast Fourier transform on its input and pass the output to an inversion/conjugation circuit 716, whose output may be passed to multiplier circuit 712.

Multiplier circuit 706 may apply $$\frac{\lambda_1(-\omega)}{\delta}$$

to its input signal.

Moreover, multiplier circuit 712 may apply $$\frac{\lambda_2(\omega)}{\delta}$$

to its input signal.

The outputs of multiplier circuits 712, 706 may be summed by summer circuit 714 to yield the $X_1(\omega)$ signal. The constituent components may be given as:

$$\lambda_1(\omega) = 1 + \frac{\omega + \Delta\omega}{2}(\beta_1 - \beta_2)$$

$$\lambda_2(\omega) = -\frac{\omega + \Delta\omega}{2}(\beta_1 + \beta_2)$$

$$\delta = \lambda_1(\omega)\lambda_1(-\omega - 2\Delta\omega) - \lambda_2(\omega)\lambda_2(-\omega - 2\Delta\omega)$$

The denotation in the bottom branch of an inversion/conjugation circuit 716, $(-\omega)^*$, illustrates operation to cyclically invert and conjugate output from FFT circuit 710. Inversion/conjugation circuit 716 may change a frequency value to a negative frequency value and perform a conjugation.

Figure 8:
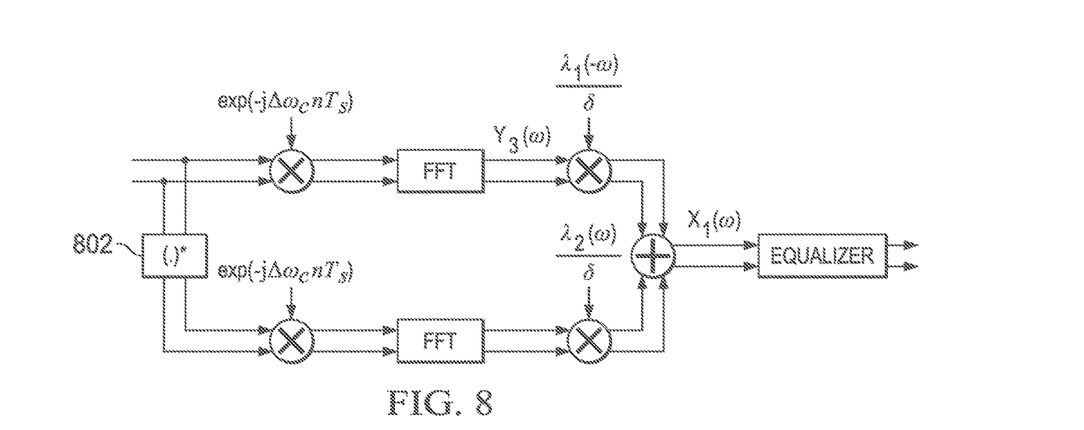
FIG. 8 illustrates another example of a digital compensation circuit for compensating carrier offset frequency and IQ coupling, according to embodiments of the present disclosure.

FIG. 8 illustrates an equivalent structure as shown in FIG. 7 according to embodiments of the present disclosure, wherein a conjugation circuit 802, $(\cdot)^*$, may have a lower throughput delay than the structure of FIG. 7. Conjugation circuit 802 may conjugate the complex baseband signal before an FFT is applied. Conjugation circuit 802 may conjugate operation as its input is a complex number.

In practice, the coupling coefficients, denoted above by β1 and β2, may need to be estimated. The estimation procedure can be performed as part of calibration of a given instance of a chip hosting system 100. Specifically, a tone can be sent from a transmitter and looped back into the receiver shown in system 100. Due to the IQ coupling effect, a spurious component will be present at the image frequency in the baseband (i.e., negative of the frequency of the transmitted baseband tone). The β1 and β1 coefficients in the IQ-decoupler structure are then varied, so that the power of the component at the image frequency is minimized. The resulting coupling coefficients are then used in the decoupler unit.

The CFO effect may be given by $$Y_1(\omega) = X_1(\omega - \Delta\omega) | y_1(t) = x_1(t) e^{-j\Delta\omega t} \quad \text{(eq. 1)}$$

in the frequency and time-domains, respectively. The IQ-coupling effect may be given as $$Y_2(\omega) = \left(1 + \frac{\beta_1 - \beta_2}{2}\omega\right) Y_1(\omega) - \left(\frac{\beta_1 + \beta_2}{2}\omega\right) Y_1^*(-\omega) \quad \text{(eq. 2)}$$

Furthermore, the CFO compensation may be specified as $$Y_3(\omega) = Y_2(\omega + \Delta\omega) \quad \text{(eq. 3)}$$

Applying equations 1-3 yields $$Y_3(\omega) =$$
$$\left(1 + \frac{\beta_1 - \beta_2}{2}(\omega + \Delta\omega)\right) Y_1(\omega + \Delta\omega) - \left(\frac{\beta_1 + \beta_2}{2}(\omega + \Delta\omega)\right) Y_1^*(-(\omega + \Delta\omega))$$

$$Y_3(\omega) = \left(1 + \frac{\beta_1 - \beta_2}{2}(\omega + \Delta\omega)\right) X_1(\omega) - \left(\frac{\beta_1 + \beta_2}{2}(\omega + \Delta\omega)\right) X_1^*(-\omega - 2\Delta\omega)$$

Defining, as discussed above, $$\lambda_1(\omega) = 1 + \frac{\omega + \Delta\omega}{2}(\beta_1 - \beta_2)$$

$$\lambda_2(\omega) = -\frac{\omega + \Delta\omega}{2}(\beta_1 + \beta_2)$$

yields $$\begin{cases} Y_3(\omega) = \lambda_1(\omega) X_1(\omega) + \lambda_2(\omega) X_1^*(-\omega - 2\Delta\omega) \\ Y_3^*(-\omega - 2\Delta\omega) = \lambda_1^*(-\omega - 2\Delta\omega) X_1^*(-\omega - 2\Delta\omega) + \lambda_2^*(-\omega - 2\Delta\omega) X_1(-\omega) \end{cases}$$

Accordingly, $$X_1(\omega) = \frac{\lambda_1^*(-\omega - 2\Delta\omega) Y_3(\omega) - \lambda_2(\omega) Y_3^*(-\omega - 2\Delta\omega)}{\lambda_1(\omega)\lambda_1^*(-\omega - 2\Delta\omega) - \lambda_2(\omega)\lambda_2^*(-\omega - 2\Delta\omega)}$$

or $$X_1(\omega) = \frac{\lambda_1^*(-\omega - 2\Delta\omega) Y_3(\omega) - \lambda_2(\omega) Y_2^*(-\omega - 2\Delta\omega)}{\delta}$$

where $$\delta = \lambda_1(\omega)\lambda_1^*(-\omega - 2\Delta\omega) - \lambda_2(\omega)\lambda_2^*(-\omega - 2\Delta\omega)$$

FIG. 7 demonstrates the implementation of the $X_1(\omega)$ expression shown above.

The elements of FIGS. 1, 5, 7, and 8 may be implemented using any suitable circuitry, such as digital circuitry, instructions for execution by a processor stored in a machine-readable medium, or combination thereof.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

The invention claimed is:

1. A receiver circuit, comprising:
a conversion circuit configured to down-convert a received radio-frequency signal to a baseband signal;
an analog-to-digital converter configured to sample the baseband signal into a sampled complex time-domain signal;
and
a digital compensation circuit configured to compensate for in-phase and quadrature-phase (IQ) distortion in a frequency domain, wherein:
in a first branch:
the digital compensation circuit is further configured to multiply using a first multiplier circuit, the sampled complex time-domain signal by a first correction for carrier frequency offset to generate a first multiplied signal;
perform a first Fast Fourier transform (FFT) on the first multiplied signal through a first FFT circuit; and
the digital compensation circuit is further configured to multiply using a second multiplier circuit, a result from the first FFT with a first factor to form a first output data;
in a second branch:
the digital compensation circuit is further configured to multiply using a third multiplier circuit, a complex baseband the sampled complex time-domain signal by a second correction for carrier frequency offset to generate a second multiplied signal;
perform a second FFT on the second multiplied signal through a second FFT circuit;
perform using an inversion and conjugation circuit, conjugation by inverting and conjugating an output of the second FFT; and
the digital compensation circuit is further configured to multiply using a fourth multiplier circuit, the inverted and conjugated output of the second FFT with a second factor to form a second output data;
wherein, the first factor is $\lambda_1(\omega)/\delta$ and the second factor is $\lambda_2(\omega)/\delta$, wherein $$\lambda_1(\omega) = \left[1 + \frac{\omega + \Delta\omega}{2}(\beta_1 - \beta_2)\right],$$

$$\lambda_2(\omega) = \left[-\frac{\omega + \Delta\omega}{2}(\beta_1 - \beta_2)\right],$$

$$\delta = \lambda_1(\omega)\lambda_1(-\omega - 2\Delta\omega) - \lambda_2(\omega)\lambda_2(-\omega - 2\Delta\omega),$$

and wherein $\omega\Delta$ corresponds to a frequency offset, co corresponds to a frequency, Ts is a sampling period, and $\beta_1$ and $\beta_2$ are coupling coefficients; and
the digital compensation circuit is further configured to add, by a summer circuit, the first output data and the second output data.

2. The receiver circuit of claim 1, wherein the first correction and the second correction are dependent upon frequency.

3. The receiver circuit of claim 1, further comprising an equalizer circuit configured to equalize a sum of the first output data and the second output data.

4. The receiver circuit of claim 1, wherein the first correction is $e^{-\Delta\omega_c nT_s}$, and the second correction is $e^{\Delta\omega_c nT_s}$, wherein $\Delta\omega_c$ corresponds to a frequency offset, n is a sample index, and Ts is a sampling period.

5. The receiver circuit of claim 1, wherein the digital compensation circuit is configured to compensate for IQ distortion arising from IQ coupling after down-conversion.

6. The receiver circuit of claim 1, wherein the radio-frequency signal includes orthogonal-frequency-domain multiplexing (OFDM) packets.

7. A system, comprising:
a conversion circuit configured to down-convert a received radio-frequency signal to a baseband signal;
an analog-to-digital converter configured to sample the baseband signal into a sampled complex time-domain signal;
and
a digital compensation circuit configured to compensate for in-phase and quadrature-phase (IQ) distortion in a frequency domain, wherein:
in a first branch:
the digital compensation circuit is further configured to multiply using a first multiplier circuit, the sampled complex time-domain signal by a first correction for carrier frequency offset to generate a first multiplied signal;

perform a first Fast Fourier transform (FFT) on the first multiplied signal through a first FFT circuit; and the digital compensation circuit is further configured to multiply using a second multiplier circuit, a result from the first FFT with a first factor to form a first output data;

in a second branch:

the digital compensation circuit is further configured to multiply using a third multiplier circuit, a complex baseband the sampled complex time-domain signal by a second correction for carrier frequency offset to generate a second multiplied signal;

perform a second FFT on the second multiplied signal through a second FFT circuit;

perform using an inversion and conjugation circuit, conjugation by inverting and conjugating an output of the second FFT; and the digital compensation circuit is further configured to multiply using a fourth multiplier circuit, the inverted and conjugated output of the second FFT with a second factor to form a second output data;

wherein, the first factor is $\lambda_1(\omega)/\delta$ and the second factor is $\lambda_2(\omega)/\delta$, wherein $$\lambda_1(\omega) = \left[1 + \frac{\omega + \Delta\omega}{2}(\beta_1 - \beta_2)\right],$$

$$\lambda_2(\omega) = \left[-\frac{\omega + \Delta\omega}{2}(\beta_1 - \beta_2)\right],$$

$$\delta = \lambda_1(\omega)\lambda_1(-\omega - 2\Delta\omega) - \lambda_2(\omega)\lambda_2(-\omega - 2\Delta\omega),$$

and wherein $\omega\Delta$ corresponds to a frequency offset, $\omega$ corresponds to a frequency, Ts is a sampling period, and $\beta_1$ and $\beta_2$ are coupling coefficients; and the digital compensation circuit is further configured to add, by a summer circuit, the first output data and the second output data.

8. The system of claim 7, wherein the first correction and the second correction are dependent upon frequency.

9. The system of claim 7, further comprising an equalizer circuit configured to equalize a sum of the first output data and the second output data.

10. The system of circuit of claim 7, wherein the first correction is $e^{-\Delta\omega_c nT_s}$, and the second correction is $e^{\Delta\omega_c nT_s}$, wherein $\Delta\omega_c$ corresponds to a frequency offset, n is a sample index, and Ts is a sampling period.

11. The system of claim 7, wherein the digital compensation circuit is configured to compensate for IQ distortion arising from IQ coupling after down-conversion.

12. The system of claim 7, wherein the radio-frequency signal includes orthogonal-frequency-domain multiplexing (OFDM) packets.

* * * * *